Figures 4, 5:
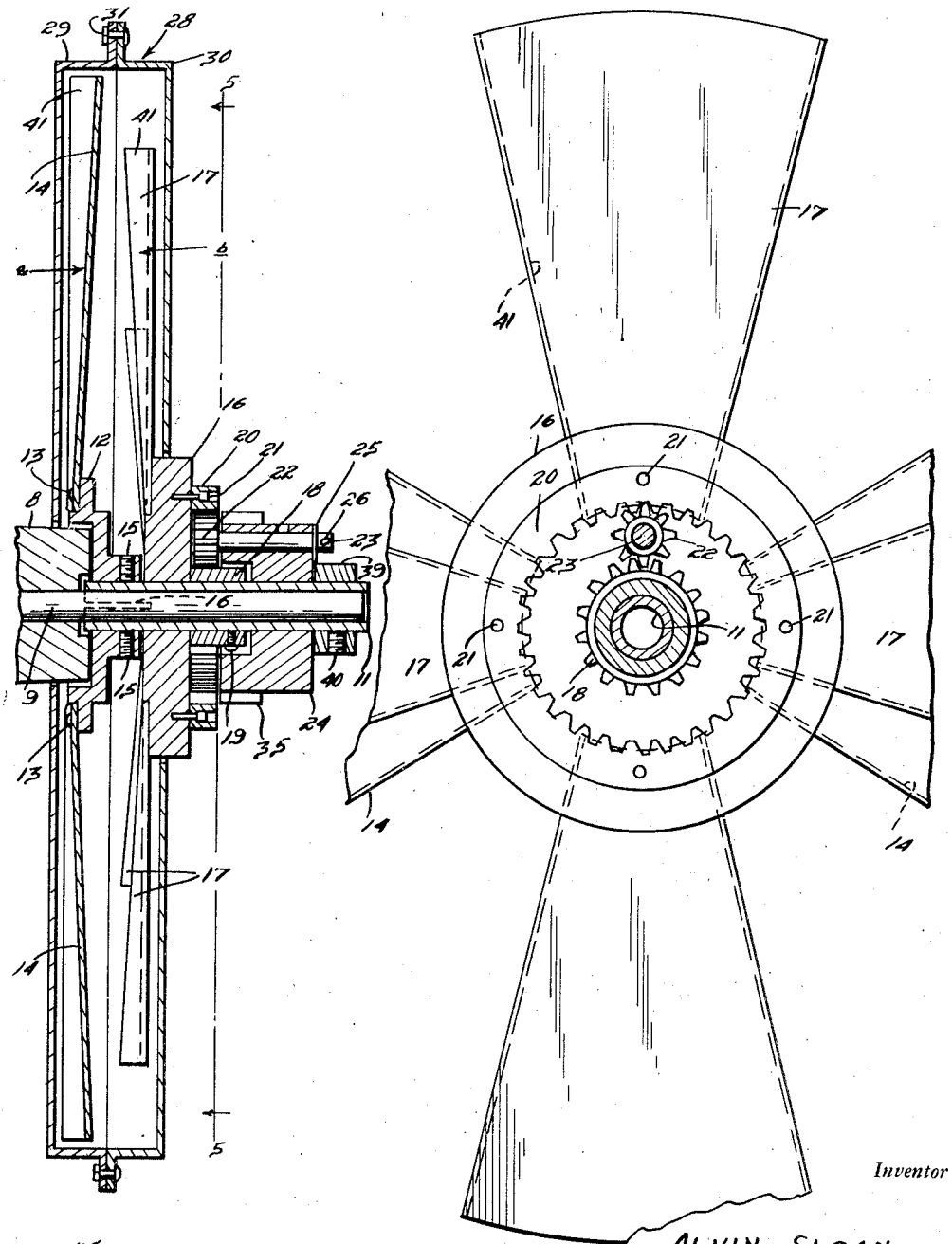

Dec. 15, 1942.    A. SLOAN    2,305,201
SHUTTERS
Filed Jan. 14, 1941    2 Sheets-Sheet 1
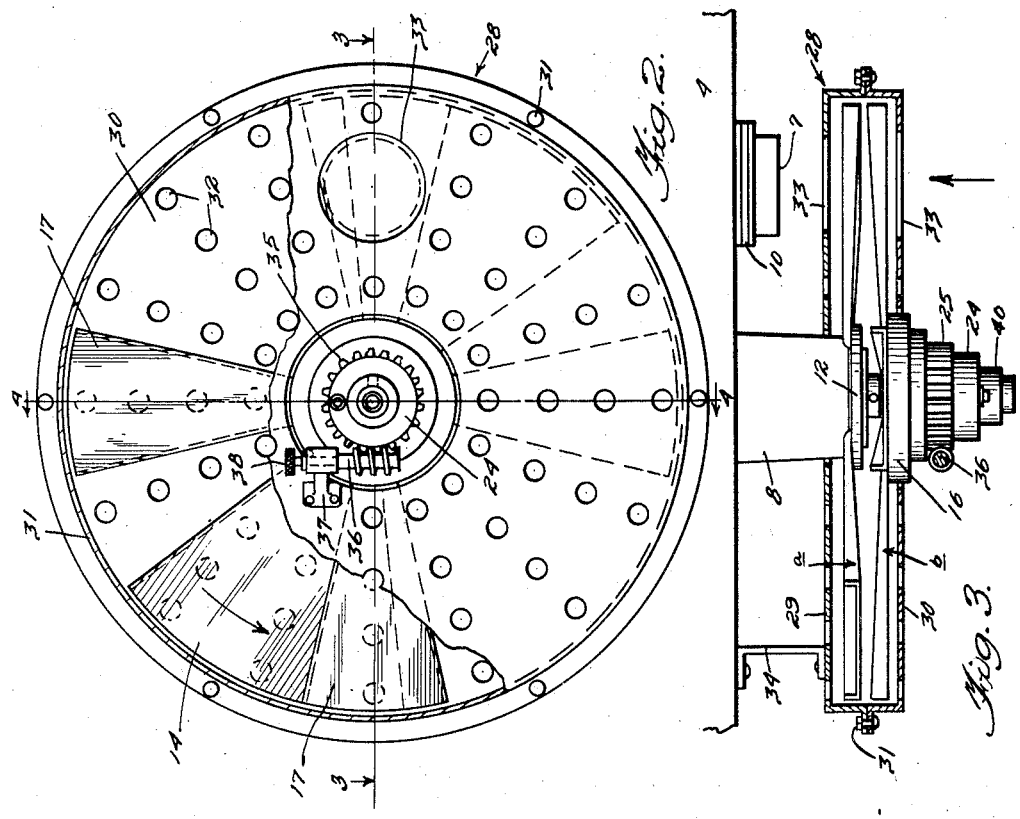
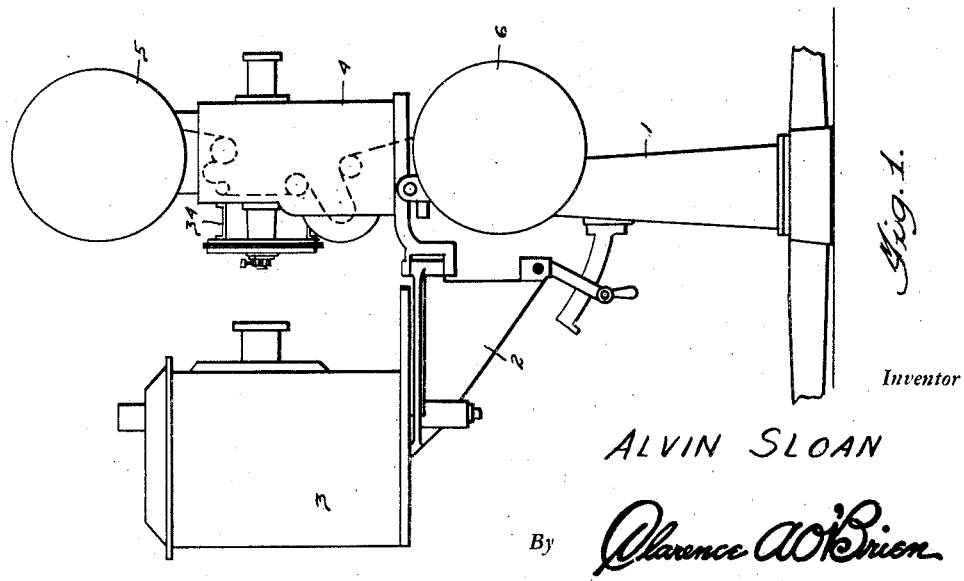
Inventor
ALVIN SLOAN
By Clarence A. O'Brien
Attorney Dec. 15, 1942.  A. SLOAN  2,305,201

SHUTTERS

Filed Jan. 14, 1941  2 Sheets-Sheet 2

Inventor
ALVIN SLOAN
By Clarence A. O'Brien
Attorney

Patented Dec. 15, 1942

2,305,201

UNITED STATES PATENT OFFICE 2,305,201

SHUTTERS

Alvin Sloan, Washington, N. J.

Application January 14, 1941, Serial No. 374,387

1 Claim. (Cl. 88—19.3)

My invention relates to improvements in shutters for motion picture projectors, and more particularly to shutters of the dual type.

Among the important objects of the invention are to provide shutter mechanism equipped for operation by the usual shutter shaft of such projectors to materially increase light transmission from the lamp of the projector to the aperture of the projector head, and to effect direction of a stream of air toward the aperture without creating an objectionable back wash in the direction of the lamp.

Another object is to provide for adjusting the shutter while the same is in operation to provide for perfect timing without interrupting operation of the projector.

Another object is to provide for decreasing load and torque requirements on the shutter shaft.

Still another object is to provide a shutter for the purposes above set forth which may be installed as a unit on the shutter shaft of projectors of commerce without necessitating change in the shaft or other basic equipment of the projector.

Other, and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in side elevation of the preferred embodiment of my invention applied to a motion picture projector, Figure 2 is a view partly in elevation and partly in vertical section looking at the rear of the shutter and showing the same drawn to an enlarged scale, Figure 3 is a view in horizontal section taken on the line 3—3 of Figure 2, Figure 4 is a view in vertical section taken on the line 4—4 of Figure 2 and drawn to an enlarged scale, and Figure 5 is a fragmentary view partly in rear elevation and partly in section taken on the line 5—5 of Figure 4 and with the casing removed.

Referring to the drawings by numerals, my invention is shown as embodied in a motion picture projector, generally illustrated, 1 designating the column, 2 the usual mounting for the lamp housing 3 and projector head 4, 5 and 6 the upper and lower film reels, respectively, 7 the usual aperture in the rear side of the head 4 for admitting light into the latter, 8 the sleeve bearing on the rear of the head 4 for the usual rotary shutter driving shaft 9 extending rearwardly from said sleeve bearing, and 10 the heat shields for the aperture 7 and with which such projectors are commonly provided. Since such projectors are well understood in the art, it is not deemed essential to a clear understanding of my invention to further describe or illustrate the projector per se.

Coming now to my improved shutter, all the essential elements thereof are assembled upon a central driving sleeve 11 fitting over the shutter driving shaft 9 and adapted to be fixed thereto to be driven thereby in a manner presently explained. Fixed to the sleeve 11, in a manner presently described, and on what constitutes the inner end thereof, is a shutter unit $a$ comprising a circular dished hub 12 fitting over the outer end of the sleeve bearing 8 and to which is secured, as by rivets 13, a pair of diametrically opposite, segmental shutter blades 14 extending radially from said hub in a common plane and presently again referred to in detail. Radial set screws 15 in the hub 12 provide for clamping the same on the inner end of the sleeve 11. The inner end of the sleeve 11 is longitudinally split, as at 16, for clamping of the portions thereof intermediate the splits to the shutter driving shaft 9 under turning of the screws 15, whereby the latter serves to both secure the hub 12 to the sleeve 11 and the latter to the shutter driving shaft 9.

Rotatably mounted on the sleeve 11 alongside the shutter unit $a$ is a second shutter unit $b$ comprising a flat annular hub 16 rotatable on said sleeve, and four segmental shutter blades 17 extending radially from said hub 16 in 90 degree angular relation and in a common plane.

The shutter units $a$, $b$, are designed to be driven at relatively different speeds and in opposite directions, relatively, by means of the following devices.

Adjacent the hub 16, on the side thereof opposite that upon which the unit $a$ is disposed, is a driving gear 18 suitably fixed on the driving sleeve 11, as by set screw 19. Surrounding the driving gear 18 is an internal driven gear 20 fixed, by screws 21, to one side of the hub 16 of the shutter unit $b$ concentrically of the driving gear 18.

A planetary, motion transmitting gear pinion 22 operatively connects the driving gear 18 with the internal driven gear 20, said pinion being fast on one end of a stub shaft 23 journalled in a collar 24 rotatably mounted on the driving sleeve 11 for adjustment about the same into different set positions for a purpose presently seen. A washer 25 on the other end of the stub shaft 23 and a pin 26 passing through said end, together with the pinion 32, secures said shaft 23 in the collar 24.

As will be understood, the axis of rotation of the shutter units $a$, $b$, is laterally offset relative to the aperture 7, the shutter driving shaft 9 being so arranged relative to the aperture 7 in the projectors, and therefore the outer ends of the blades 14, 17, rotate past the aperture 7.

A circular casing 28 is provided for enclosing the shutter units $a$, $b$, said casing comprising a pair of annular sections 29, 30, detachably secured together, as at 31, the sections being perforated, as at 32, for the passage of air through the casing and having a pair of aligned apertures 33 therein arranged axially of the aperture 7 to admit light through the casing to said aperture 7. Bracket arms, as at 34, provide for attaching the casing 28 to the head 4 in proper position.

For adjusting the collar 24 to different set positions, external teeth 35 are provided on the same for meshing with a vertically disposed worm shaft 36 which may be mounted on the casing 28, as by means of bearing bracket 37, and provided with a knurled head 38 for adjusting the same, whereby said shaft 36 may be rotated into different set positions and consequently the collar 24 correspondingly adjusted to set the planetary motion transmitting gear pinion 22 circumferentially of the driving gear 18.

A set collar 39, and set screw 40, on the sleeve 11 provide for retaining the collar 24 on said sleeve.

Returning now to the shutter units $a$, $b$, each blade 14 of the shutter unit $a$ includes in area 60 degrees of the cycle of revolution of the shutter driving shaft 9, whereas, each blade 17 of the shutter unit $b$ includes 30 degrees of said cycle.

As will be clear from the foregoing description, under rotation of the shutter driving shaft 9, the sleeve 11 and shutter unit $a$ will be driven in one direction and the planetary motion transmitting gear pinion 22 and internal gear 20 in the opposite direction, thereby rotating the shutter unit $b$ reversely relative to the direction of rotation of the shutter unit $a$. As has been previously stated, the units $a$, $b$, are designed to be rotated at different speeds relatively. In this connection, it is to be noted that the driving gear 18 has sixteen teeth, the planetary gear pinion 22 eight teeth and the internal gear 20 thirty-two teeth so that said gearing forms a reduction drive whereby the shutter unit $b$ is driven at one-half the speed of rotation of the shutter unit $a$.

The edges of the blades 14, 17, are bent at right angles to form air fins 41 for deflecting the air from the lamp housing 3 toward the projector head 4.

As will now be seen, my invention involves the use of two shutter units of different blade areas revolving in opposite directions about a common axis to cut the same beam of light at approximately the same point between the source of light 3 and the aperture 7, from opposite directions, and in a manner such that the heat is reduced at the same proportional rate as with the usual shutter. By adjusting the set collar 24, and hence the planetary motion transmitting gear pinion 22 into different set positions, in the manner already described, the shutter units $a$, $b$, may be accurately timed while in motion by varying the point of interception of the beam of light by the blades 14, 17, until the maximum light, and minimum flicker is apparent upon the screen, not shown, and represents a point at which the intersection of the blades 14, 17, occurs directly on the axis of the beam of light from the lamp housing 3.

As further explanatory of the operation of the described invention, let it be assumed that the shutter unit $a$ is rotating at the rate of 1440 R. P. M. counterclockwise as viewed in Figure 2. It will be evident that the shutter unit $b$, under operation of the described reduction gearing, will be rotating clockwise at the rate of 720 R. P. M. The intermittent movement of the projector draws the film, shown in dotted lines, across the aperture 7 of the projector head during one-quarter of a cycle of operation of the shutter unit $a$, but it has been found that the ideal shutter must cover two-thirds of the beam of light illuminating the aperture 7 of the projector when the intermittent begins to move and that this same beam must still be two-thirds covered when the intermittent comes to rest. Therefore, the relationship of the two shutter units $a$, $b$, to the intermittent must be such that the leading edge of the blades 14 of the shutter unit $a$ is half-way across the beam of light and the shutter unit $b$ has intercepted it covering the other half when the intermittent is in motion and must be in a similar position at the time the intermittent ceases to move. This action causes the light to be cut off approximately twice as fast as is possible when a single shutter is used. This increase in speed in blocking off the light and again allowing it to fall on the screen results in an increase of approximately twenty percent in screen illumination.

As the shutter units $a$, $b$, both create a current of air surrounding the blades 14, 17, due to the shape of the air fins 41, and as they rotate in opposite directions, the stream of air induced therefrom is directed toward the aperture 7 of the projector head with extreme velocity and with a swirling motion.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

In a shutter mechanism, a pair of shutter units each including a hub and blades, and means for rotating the two shutter units around the same axis in opposite directions and at different speeds, and means for adjusting one shutter unit relative to the other, the blade area of one shutter unit being different from that of the other shutter unit, the blades of one unit each having an area equal to sixty degrees of the cycle of rotation of the unit, and the blades of the other unit each having an area equal to thirty degrees of the cycle of rotation of the unit, and said other unit being rotated at half the speed of rotation of said one unit and comprising twice the number of blades as said one unit.

ALVIN SLOAN.